July 22, 1969   R. A. WHITE ET AL   3,457,554
METHOD OF STORING A DISCRETE AMPLITUDE LEVEL OF AN
ANALOG SIGNAL IN A THIN FERROMAGNETIC FILM
Filed May 17, 1965   4 Sheets-Sheet 1

INVENTORS
ROBERT A. WHITE
RAYMOND H. JAMES
BY
ATTORNEY

United States Patent Office

3,457,554
Patented July 22, 1969

3,457,554
METHOD OF STORING A DISCRETE AMPLITUDE LEVEL OF AN ANALOG SIGNAL IN A THIN FERROMAGNETIC FILM
Robert A. White, St. Paul, and Raymond H. James, Bloomington, Minn., assignors to Sperry Rand Corporation, New York, N.Y., a corporation of Delaware
Filed May 17, 1965, Ser. No. 456,365
Int. Cl. G11b 5/02, 5/74
U.S. Cl. 340—174        6 Claims

ABSTRACT OF THE DISCLOSURE

A method of operating a thin ferromagnetic film memory element as an analog signal storage device. The characteristic phenomenon of the thin ferromagnetic film element known as dispersion is utilized to permit the storage of discrete amplitude levels of an analog signal as a function of the degree of rotation of the element's magnetization when subjected to coincident longitudinal drive field, the intensity of which is a function of the analog signal amplitude, and transverse drive field switching components.

---

The present invention is capable of storing the amplitude of an electrical signal at any desired sample time as a degree of the partial switching of the storage element. The invention contemplates the use of a thin ferromagnetic film having the property of uniaxial anisotropy; applying a strong transverse drive field thereto so as to rotate the film's magnetization into a position that is transverse, i.e., orthogonal, to its axis of anisotropy; applying a longitudinal drive field thereto whose intensity is a function of the to-be-sampled electrical signal's amplitude, which longitudinal drive field rotates the film's magnetization from said transverse orientation at an angular degree that is a function of the conjoint action of the transverse and longitudinal drive field intensities; then removing the transverse drive field to permit the film's magnetization to collapse about said axis of anisotropy, the magnetization being biased more in one direction than in the other along said axis as a function of the intensity of the longitudinal drive field at the time of the removal of the transverse drive field. Accordingly, discrete levels of data, i.e., the amplitude of the sampled signal at the time of the removal of the transverse drive field, are stored in the thin ferromagnetic film as a corresponding discrete level of the degree of the partial switching thereof.

In an embodiment providing nondestructive readout of the information stored in the information core, i.e., the thin ferromagnetic film in which the discrete level of data is stored as a corresponding level of the degree of partial switching, multiple core arrangements such as disclosed in Patent No. 3,125,743 and Patent No. 3,095,555 may be utilized. In such arrangements the information is stored in the information core, i.e., the relatively high coercivity core, which information core's external remanent field biases the magnetization of the readout core, i.e., the reltaively low coercivity core, causing the readout core to assume a discrete level of partial switching corresponding to the discrete level of partial switching of the information core. For the readout cycle a readout drive field of the proper intensity effects a substantial change in the magnetization of the readout core, but not in the magnetization of the information core due to the difference in their coercivities. The substantial change in the magnetization of the readout core induces a correspondingly intense output signal in an output line coupled thereto which output signal is representative of the amplitude of the electrical signal at the particular sample time. After the readout cycle is terminated the information core's external remanent magnetic field again biases the readout core's magnetization into the previously assumed discrete level of partial switching. Accordingly, such information may be repeatedly read out without destruction thereof.

The value of the utilization of small cores of magnetizable material as logical memory elements in electronic data processing systems is well known. This value is based upon the bistable characteristics of magnetizable cores which include the ability to retain or remember magnetic conditions which may be utilized to indicate a binary bit "1" or a binary bit "0." As the use of magnetizable cores in electronic data processing equipment increases it is desirable to utilize memory elements which possess the property of nondestructive readout, for by retaining the initial state of remanent magnetization after readout, the rewrite cycle required with destructive readout devices is eliminated. As used therein the term "nondestructive readout" shall refer to the sensing of the relative direction and/or discrete level of the degree of the partial switching thereof without destroying or reversing such remanent magnetization. This should not be interpreted to mean that the state of the remanent magnetization of the core containing the information being sensed is not temporarily disturbed during such nondestructive readout.

The present invention in its preferred embodiment senses the informational state of the readout core which informational state is determined by that of the information core. This invention may be used to its best advantage when the core that is to be sensed by nondestructive readout is a thin ferromagnetic film such as formed by the evaporation or deposition process disclosed in Patent No. 2,900,282, and this application shall proceed relative to the use of such magnetic films; however, no limitation to magnetic film cores of the type disclosed in such patent is intended. Such thin ferromagnetic films may, or may not, exhibit single domain properties providing single domain rotational switching, but shall possess the property of uniaxial anisotropy. The term "single domain property" may be considered the characteristic of a three dimensional element of magnetizable material having a thin dimension that is substantially less than the width and length thereof wherein no domain walls can exist parallel to the large surface of the element. When such films possess the property of uniaxial anisotropy there is provided in the plane of the film an axis, termed the easy axis, along which the remanent magnetization shall lie.

In Patent No. 2,900,282 there is a teaching of the evaporation and deposition of magnetic material on a substrate to form a very thin film having geometric and magnetic characteristics that may be closely controlled. In Patent No. 3,030,612 there is a teaching of the use of a deposited film in conjunction with windings in the form of flat conductors or printed circuits. This latter patent teaches the use of coincident longitudinal and transverse drive fields for the placing of the remanent magnetization of the thin ferromagnetic film into a first or second and opposite saturated remanent state. Patent No. 3,125,743 adds to these patents the use of a second core preferably of the thin ferromagnetic film type disposed adjacent to the first core with the coercivity of the second core being substantially less than the coercivity of the first core. Under such circumstances the current to the core windings may be regulated so that the first core will not switch upon the application of a given interrogating field, but the second core will switch or not, according to its magnetic state to cause an output signal which indicates the magnetic state of the first core. In Patent No. 3,095,555 there is taught an improvement of the above Patent No. 3,125,743 in which a third core is added to the two core element of the latter referred to patent. This third core provides a static bias field about the readout core of the two core element which permits the utilization of a substantially smaller interrogate pulse with the resulting improvement in readout characteristics, power requirements and producibility. Accordingly, it is within the scope of the present application to provide a device that may or may not incorporate any or all of the teaching and arrangement of the hereinabove discussed patents but which does include at least one core of magnetizable material that posesses a suitable dispersion characteristic so as to provide a reproducible level of partial switching of the magnetization thereof when subjected to properly coordinated longitudinal and transverse drive fields.

The terms "flux density," "flux level," etc., when used herein shall refer to the net external magnetic effect of a given internal magnetic state; e.g., the flux density of a demagnetized state shall be considered to be a zero or minimum flux density while that of a saturated state shall be considered to be a maxamum flux density of a positive or negative sense.

The terms "signal," "pulse," "field," etc., when used herein shall be used interchangably to refer to the current signal that produces the corresponding magnetic field and to the magnetic field that is produced by the corresponding current signal.

The preferred embodiment of the present invention is concerned with the establishment of a predetermined variable magnetic flux level in a magnetizable element which flux level is representative of the instantaneous amplitude of an analog signal. In the preferred embodiment an instantaneous amplitude of an analog signal from a first source is gated into the magnetizable element by the trailing edge of a strobe pulse from a second source. The analog signal is coupled to the magnetizable element as a longitudinal drive field component, the maximum intensity of which is limited to a level well below the switching threshold $NI_0$ of the magnetizable element such that the analog signal alone is incapable of effecting the flux level thereof. The strobe pulse is coupled to the magnetizable element as a transverse drive field component and has an intensity sufficient to rotate the magnetizable element's magnetization orthogonal to its easy axis, i.e., along its hard axis. With a magnetizable element possessing the suitable dispersion characteristics the longitudinal drive field component produced by the analog signal biases the magnetizable element's magnetization away from such hard axis a degree that is a function of the intensity of the longitudinal drive field. At the particular time that the analog signal amplitude is to be sampled the strobe pulse generated transverse drive field is removed permitting the analog signal to set the magnetization of the magnetizable element into a discrete level of partial switching which level of partial switching is representative of the amplitude of the analog signal at the time of the removal of the transverse drive field. Different incremental portions of the analog signal may be gated into the magnetizable elements by the determination of the particular turn-off time of the strobe pulse. Additionally, a plurality of different incremental portions of the analog signal may be gated into a corresponding plurality of different magnetizable elements by delaying the analog signal different time increments with respect to the strobe pulse wherein each different time delayed increment of the transient signal is gated by the strobe pulse into a separate magnetizable element so that each separate magnetizable element stores a flux level representative of a different sampled portion of the analog signal.

Accordingly, it is a primary object of the present invention to provide a method for the sampling of an analog signal.

It is a further object of the present invention to provide a method for the flux gating of an incremental portion of an analog signal by a strobe pulse.

It is a further object of the present invention to provide a method whereby an analog signal is sampled by a strobe pulse wherein the strobe pulse couples an intense transverse drive field to a thin ferromagnetic film element setting the element's magnetization along the element's hard axis and wherein the analog signal coupled a longitudinal drive field to said element biasing the element's magnetization away from said hard axis a function of the analog signals' intensity.

It is a further and more general object of the present invention to provide a novel method of operating a magnetizable element as an analog signal sampling device.

These and other more detailed and specific objects will be disclosed in the course of the following specification, reference being had to the drawings, in which.

Figure 1A:
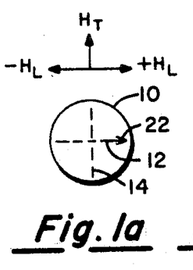
FIG. 1a through FIG. 1i are illustrations of the various magnetic states of a magnetizable element incorporating the present invention.
Figure 1B:
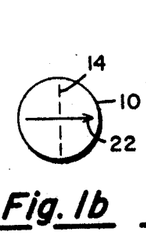
Figure 1C:
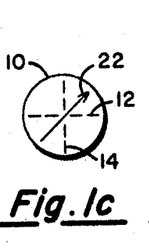
Figure 1D:
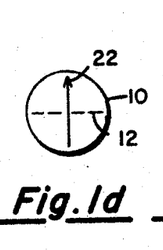
Figure 1E:
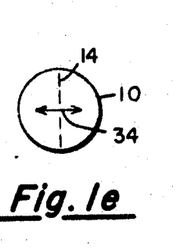
Figure 1F:
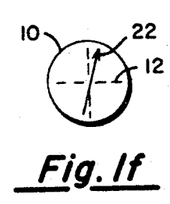
Figure 1G:
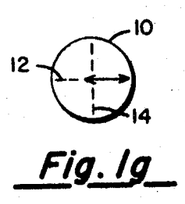
Figure 1H:
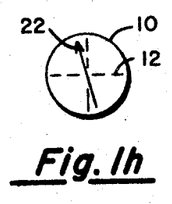
Figure 1I:
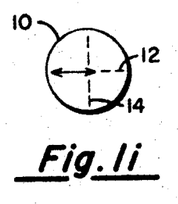
Figure 2:
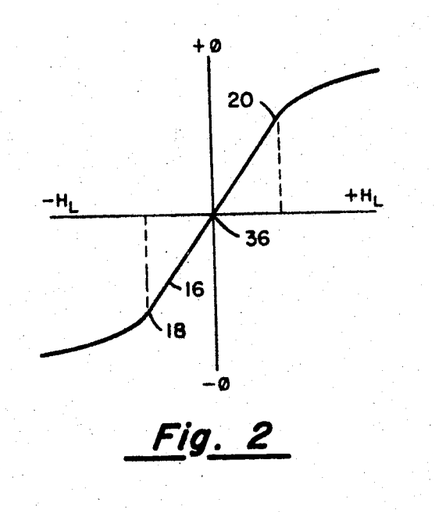
FIG. 2 is a dispersion curve characterizing the magnetizable element utilized in the present invention.

With particular reference to FIG. 1 there are illustrated the progressive steps in the partial switching of the magnetizable elements or cores utilizing the present invention and which cores possess the dispersion characteristic of FIG. 2. The curve of FIG. 2 illustrates a suitable dispersion characteristic which permits the core to provide a reproducible level of partial switching of the magnetization thereof when subjected to properly coordinated longitudinal and transverse drive fields. With particular reference to FIG. 1a there is illustrated a thin ferromagnetic film core 10 having the property of uniaxial anisotropy providing an easy axis 12 along which the film's remanent magnetization shall lie in a first or second and opposite direction. Additionally, for purposes of the present discussion film 10 may be considered, due to its property of uniaxial anisotropy, to possess a hard axis 14 that is orthogonal to its easy axis 12. As stated hereinabove film 10 is of a magnetizable material that possesses a suitable dispersion characteristic as illustrated by FIG. 2.

FIG. 2 is a plot of the irreversible switching characteristic of film 10 and is obtained by the application of a strong transverse drive field thereto, i.e., orthogonal to easy axis 12 or parallel to hard axis 14, so as to rotate the film's magnetization into a position along its hard axis 14; applying a longitudinal drive field thereto of an increasingly positive or negative intensity, which longitudnal drive field rotates the film's magnetization from said transverse orientation to an angular degree from said hard axis that is a function of the conjoint action of the transverse and longitudinal drive field intensities; then removing the transverse drive field to permit the film's magnetization to collapse about the easy axis; and then reading out the amplitude of the partially switched flux level of the film's magnetization and plotting such amplitude versus the intensity of the applied longitudinal drive field. Upon inspection of FIG. 2 it is apparent that curve 16 has a substantially linear portion between the limits defined by points 18 and 20 which limits define the maximum negative and positive intensities of the longtudnal drive field that may be applied to film 10 to achieve a corresponding linear relationship between the intensity of the applied longitudinal drive field and the partially switched flux level of core 10. The article entitled "Dispersion in Thin Magnetic Films" by J. M. Daughton and A. V. Pohm, 1963, Proceedings of the Intermag Conference, Wahhington, D.C., Apr. 17, 18, 19, 1963, pp. 15–5–1 through 15–5–6 provides an excellent background discussion of the theory of dispersion in thin magnetic films as utilized in the present invention.

Figure 3:
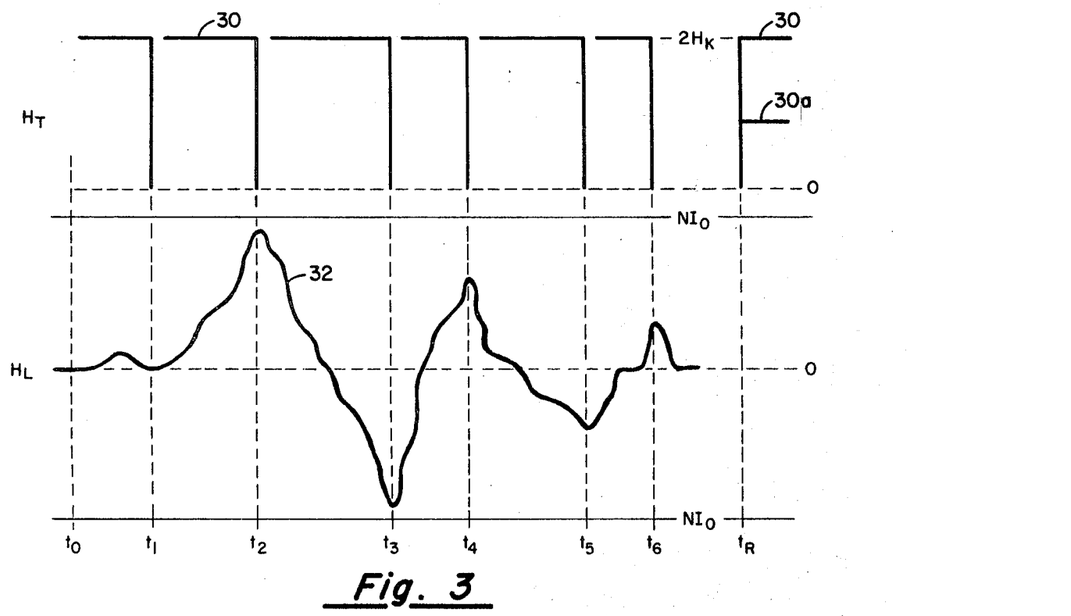
FIG. 3 is an illustration of exemplary waveforms that may be utilized to describe the present invention with respect to the illustrations of FIG. 1a through FIG. 1i.

With particular reference to FIG. 3 there is illustrated a signal 30 providing the transverse drive field $H_T$ whose intensity is equal to $2H_K$, the anisotrophy field of film 10. Additionally, there is illustrated a signal 32 whose amplitude is representative of a phenomenon that is wished to be sampled and for which its amplitude and polarity is representative of the intensity of the longitudinal drive field $H_L$ that is coupled to film 10. As noted therein the maximum amplitude of analog signal 32 is limited to a value below $NI_o$ which is the longitudinal drive field's switching threshold of film 10. For purposes of the present discussion assume that the magnetization of film 10 is set in a first saturated state represented by vector 22 as in FIG. 1b. If at time $t_o$ transverse drive field 30 is coupled to film 10, vector 22 is rotated out of alignment with easy axis 12 of film 10 as illustrated in FIG. 1c and into alignment with hard axis 14 of film 10 as illustrated in FIG. 1d. Next, assume that at time $t_1$ transverse drive field 30 is terminated. As the intensity of the longitudinal drive field 32 is at time $t_1$ equal to 0 the magnetization of film 10 will receive a 0 longitudinal biasing effect permitting the magnetizations of film 10 to collapse about the hard axis 14 in a random fashion in which equal numbers of magnetic domains will be oriented in a first and a second and opposite direction along axis 12 as schematically illustrated by vector 34 of FIG. 1e. This state is defined as the demagnetized state and may be represented as point 36 of FIG. 2.

Secondly, assume that the transverse drive field 30 is being coupled to film 10 as schematically illustrated in FIG. 1d and that at time $t_2$ transverse drive 30 is removed. At this time the conjoint action of the longitudinal and transverse drive fields 32 and 30, respectively, bias the magnetization vector 22 out of alignment with the hard axis 14 into a position schematically illustrated as in FIG. 1f where upon the removal of transverse drive field 30 at time $t_2$ the magnetization of film 10 collapses about the hard axis 14 thereof in a biased manner causing the magnetization of film 10 to come to rest in a condition schematically represented in FIG. 1g. This magnetic state of film 10 may be represented as point 20 of FIG. 2.

Thirdly, if, as previously discussed, transverse field 30 rotates the magnetization of film 10 into alignment with its hard axis as schematically illustrated in FIG. 1d the conjoint action of longitudinal drive field 32 and transverse drive field 30 at time $t_3$ rotates the magnetization of film 10 into a bias position with respect to its hard axis 14 as schematically illustrated in FIG. 1h. When the magnetization of film 10 is set into a biased state as illustrated in FIG. 1h and transverse drive field 30 is removed at time $t_3$ the biased magnetization of film 10 collapses in a random but biased manner about its hard axis 14 assuming a partially switched flux level schematically illustrated by FIG. 1i. This magnetic state may be described as illustrating the magnetic condition of film 10 when at point 18 of FIG. 2. Accordingly, it is apparent that intermediate intensities of the longitudinal drive field 32, such as at times $t_4$, $t_5$, or $t_6$, would establish the magnetization of film 10 in partially switched states intermediate the maximum operating range defined by points 18 and 20 of FIG. 2.

Figure 4:
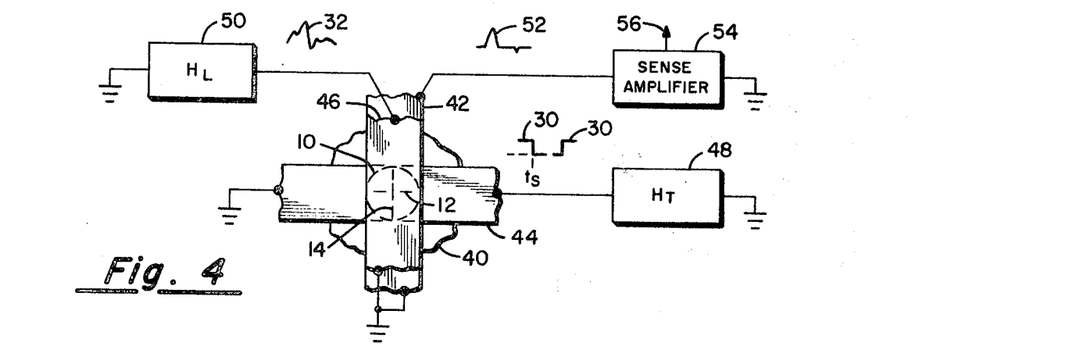
FIG. 4 is an illustration of a detector that may utilize the present invention.
Figure 5:
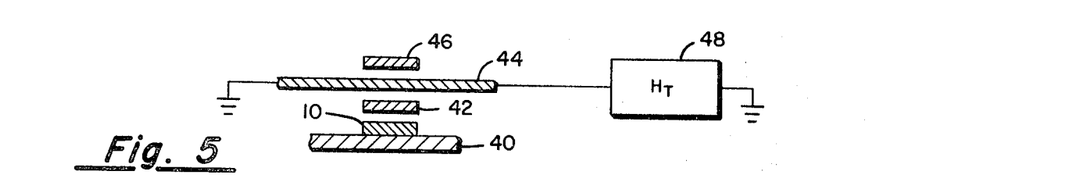
FIG. 5 is an illustration of a cross section of the detector of FIG. 4 showing the respective orientation of the elements thereof.

With particular reference to FIGS. 4 and 5 there is disclosed a first preferred embodiment of the present invention. In this embodiment information core 10 is external to the drive circuitry with the following elements assembled in a stacked, superposed, sandwich array with suitable insulators—not illustrated for clarity—therebetween; substrate 40; information film 10; sense line 42; transverse drive line 44; and longitudinal drive line 46. Film 10 is oriented in a parallel, planar relationship with the planes of the other elements of the array with its easy axis 12 parallel to the physical axis of transverse drive line 44; i.e., the magnetic axis of a drive line is orthogonal to its physical axis as defined by its longitudinal axis with the magnetic field set up about said drive line as determined by the well known right-hand rule. Further, both sense line 42 and longitudinal drive line 46 are oriented orthogonal to the easy axis 12 of film 10 or parallel to hard axis 14 of film 10. Operation of the embodiment of FIGS. 4 and 5 is as discussed hereinbefore and will be discussed with particular reference to signals 30 and 32 of FIG. 3. Initially, signal 30 representative of the transverse drive field is coupled to drive line 44 by transverse current signal source 48 at time $t_0$. As before, transverse drive field 30 rotates the magnetization of information core 10 into alignment with its hard axis 14. Concurrent with the coupling of transverse drive field 30 to film 10 by line 44 analog signal source 50 couples signal 32, representative of the analog signal that is to be sampled and which provides the longitudinal drive field to film 10, biasing the magnetization vector 22 of film 10 out of alignment with its easy axis as a function of the conjoint action of transverse drive field 30 and longitudinal drive field 32. If at time $t_2$ transverse drive field 30 is removed the magnetization of film 10 is permitted to collapse about its hard axis 14 achieving a partially switched flux level represented by point 20 of FIG. 2.

Destructive readout of the flux level established in information core 10 is accomplished by the coupling of transverse drive field 30 to drive line 44 by transverse drive field source 48. The fast and abrupt leading edge of transverse drive field 30 causes a rapid reorientation of the magnetization of core 10 along hard axis 14 inducing in sense line 42 a signal 52 whose amplitude is representative of the partially switched flux level previously set into film 10. Readout signal 52 is in turn coupled to sense amplifier 54 that provides a suitable signal at its output terminal 56.

Figure 6:
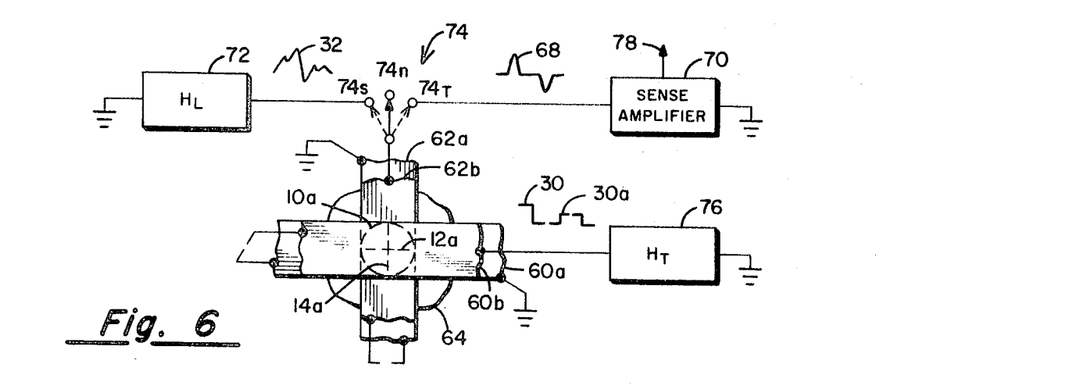
FIG. 6 is an illustration of a further detector that may use the present invention.
Figure 7:
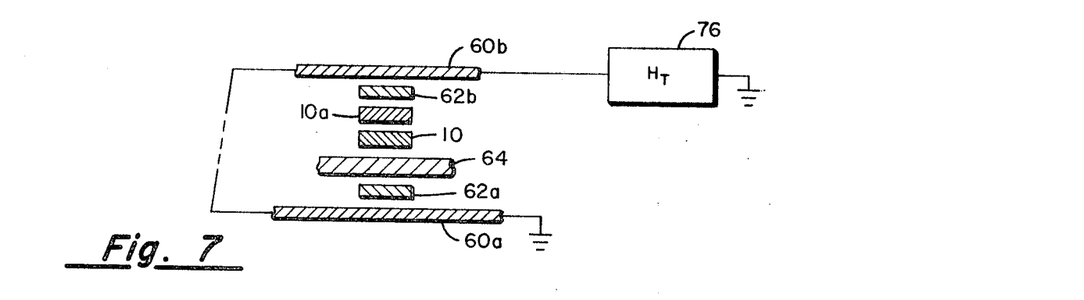
FIG. 7 is an illustration of a cross section of the detector of FIG. 6 illustrating an orientation of the elements thereof.

With particular reference to FIGS. 6 and 7 there is disclosed a second preferred embodiment of the present invention. In this embodiment there is utilized a Bicore element including information core 10 and readout core 10a with the Bicore element internal to the drive circuitry with the following elements assembled in a stacked, superposed, sandwich array with suitable insulators—not illustrated for clairity—therebetween; transverse drive line 60a; longitudinal drive line 62a; substrate 64; information core 10; readout core 10a; longitudinal drive line 62b; and transverse drive line 60b. Cores 10 and 10a are oriented with their easy axes parallel with core 10 having a relatively high coercivity and core 10a having a relatively low coercivity whereby in their static condition the external remanent magnetic field of core 10 establishes the flux level of core 10a. Such Bicore elements are well known and a detailed discussion of their theory of operation shall not be included herein. However, the article "Coincident Current Nondestructive Readout From Thin Magnetic Films," Lewis J. Oakland and Thomas D. Rossing, Journal of Applied Physics, Supplement, vol. 30, No. 4, pp. 54S–55S, April 1959 provides an excellent discussion of the theory of operation of such an element.

The embodiment of FIGS. 6 and 7 has several differences distinguishing it from the embodiment of FIGS. 4 and 5. A first distinction is that lines 60 and 62 are formed of two separate portions identified as 60a and 60b and 62a and 62b, respectively, and form a wraparound arrangement whereby said lines form a U-type configuration flowing over and returning under the magnetizable storage element formed by information core 10 and readout core 10a. Additionally, line 62 serves a dual function; coupling the analog signal generated longitudinal drive field to information core 10 and, intercepting the flux change in readout core 10a when effected by a transverse drive field upon readout and coupling the readout signal 68 to sense amplifier 70.

Operation of the embodiment of FIGS. 6 and 7 is substantially similar to that of the embodiment of FIGS. 4 and 5 except for the peculiarities due to the use of the Bicore element as the storage element. At time $t_0$ with switch 74 placed into position 74s analog current signal source 72 couples analog signal 32 to line 62. This effects cores 10 and 10a with a longitudinal drive field whose intensity is representative of the analog signal amplitude. Additionally, at time $t_0$ transverse current signal source 76 couples signal 30 to line 60 which signal 30 establishes a transverse drive field in the area of cores 10 and 10a rotating the magnetization of cores 10 and 10a into alignment with their hard axes. As before the conjoint action of transverse drive field 30 and longitudinal drive field 32 biases the magnetization of films 10 and 10a out of alignment with their hard axes as a function of their respective intensities. As cores 10 and 10a are of differing coercivities iwth information core 10 having a substantially higher coercivity than readout core 10a the intensity of transverse drive field 30 is such as to rotate the magnetization of the higher coercivity film 10 into alignment with its hard axis and accordingly the magnetization of both cores 10 and 10a are by the action of transverse drive field 30 alone rotated into alignment with their hard axes. If at time $t_2$ transverse drive field 30 is removed the magnetization of core 10 (ignoring for the moment its affect upon core 10a) is permitted to collapse about its easy axis achieving a partially switched flux level represented by point 20 of FIG. 2. As the high coercivity information film establishes the remanent magnetic state of the low coercivity readout film 10a and with no signals applied thereto the external remanent magnetic field of information core 10 acting in the area of readout core 10a so affects the magnetization of readout core 10a as the establish its magnetization in a partially switched flux level representative of the partially switched flux level of the magnetization of core 10 but in an antiparallel magnetic sense due to the closed flux path effect of cores 10 and 10a.

Readout of the flux level established in the Bicore element formed by cores 10 and 10a is accomplished by the coupling of a transverse drive field 30a to drive line 60 by transverse drive field source 76. However, as distinguished from the previous operation of the embodiment of FIGS. 4 and 5 where the transverse drive field intensity is equal for both the write-in and readout operation, in the embodiment of FIGS. 6 and 7 the intensity of the transverse drive field is limited to a value 30a that is effective to rotate the magnetization of readout core 10a but is ineffective to rotate the magnetization of information core 10. As before, the fast and abrupt leading edge of transverse drive field 30a causes a rapid reorientation of the magnetization of core 10a along its hard axis inducing in sense line 62 a signal whose amplitude is representative of the partially switched flux level previously set into information core 10 and accordingly, readout core 10a. With switch 74 placed into position 74t readout signal 68 is in turn coupled to sense amplifier 70 that provides a suitable signal at its output terminal 78. Upon removal of transverse drive field 30a the external remanent magnetic field of information core 10 again effects the magnetization of readout core 10a causing it to assume again a partially switched flux level representative of the partially switched flux level of information core 10 but oriented in an antiparallel magnetic sense due to the closed flux path effect of cores 10 and 10a. Subsequent successive coupling of transverse drive field 30a to line 60 provides repetitions of the above described effect upon readout core 10a without destroying the partially switched flux level set into information core 10 and correspondingly readout core 10a. Accordingly, the embodiment of FIGS. 6 and 7 provides an arrangement whereby the amplitude of an analog signal may be sampled at any desired time, setting the magnetization of an affected magnetizable element into a partially switched flux level that is representative of the amplitude of the analog signal at the sampled time, and providing nondestructive readout of the information stored therein.

Figure 8:
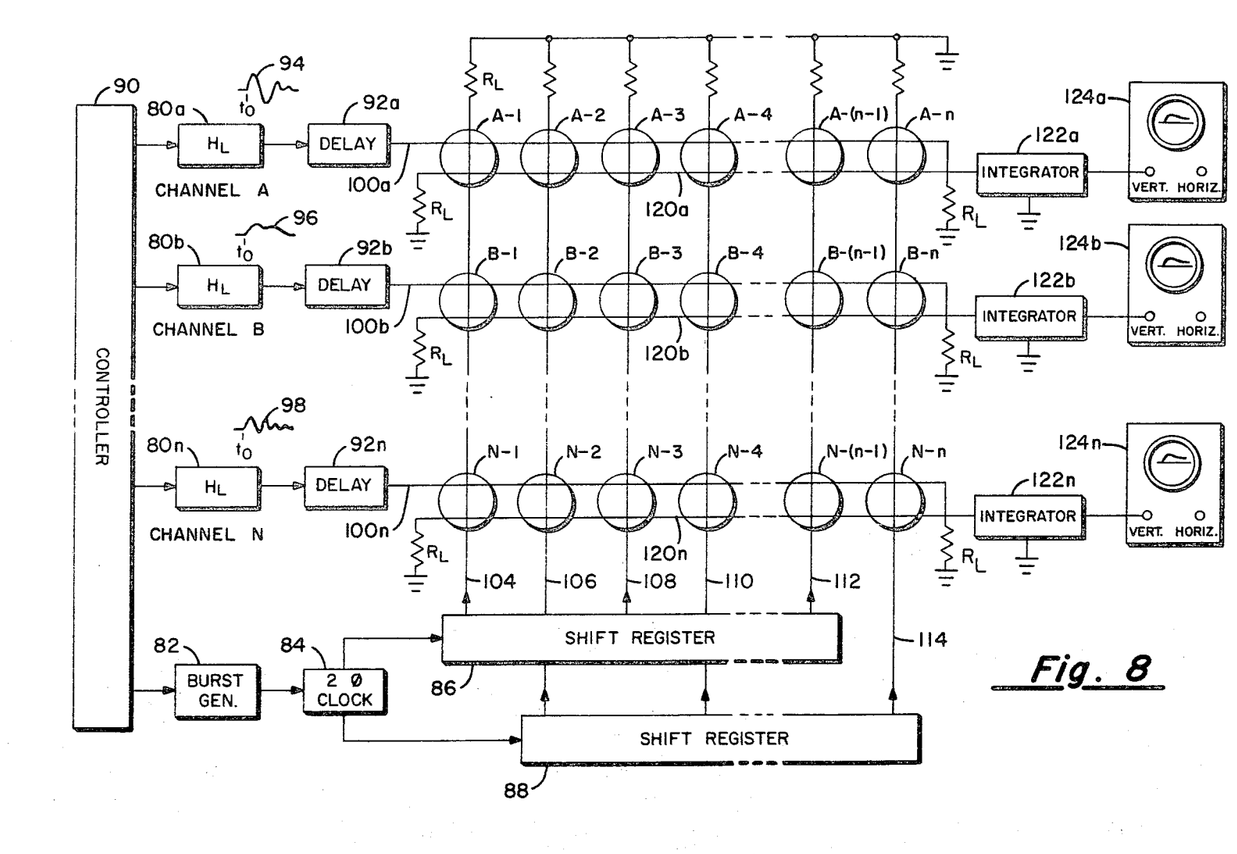
FIG. 8 is an illustration of a multichannel detector system capable of sampling a plurality of analog signals at a plurality of different sampling times.
Figure 9:
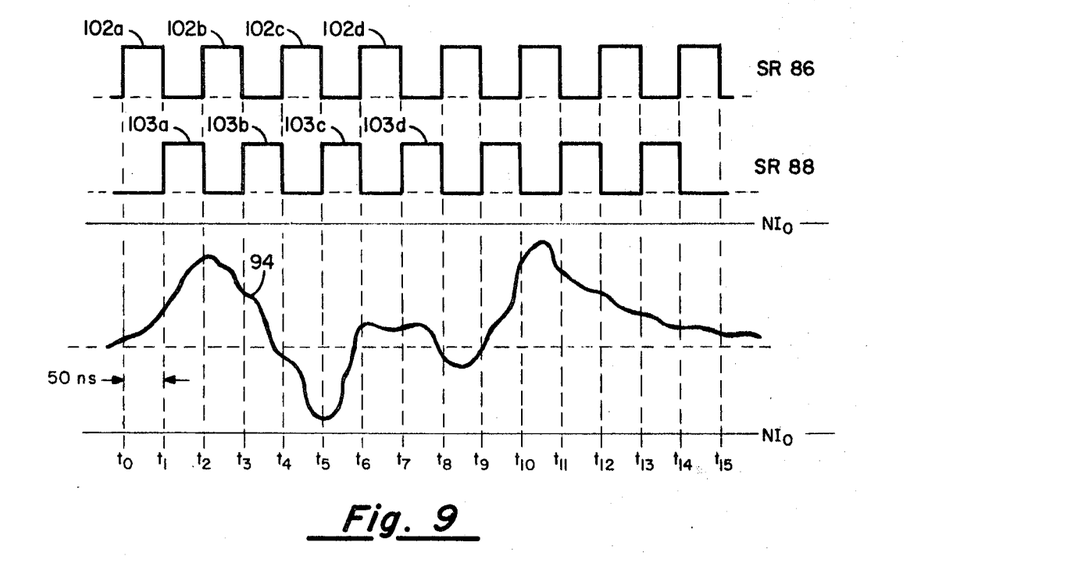
FIG. 9 is an illustration of exemplary waveforms utilized to describe the operation of the embodiment of FIG. 8.

With particular reference to FIG. 8 there is illustrated a block diagram of a multichannel, multibit recorder system utilizing the signal waveforms of FIG. 9. In this embodiment of an exemplary system utilizing the present invention, the detector elements may be of any magnetizable material possessing the necessary characteristics as illustrated in FIG. 2 but for purposes of the present discussion may be considered to consist of a single planar thin ferromagnetic film as discussed with particular reference to the embodiment of FIGS. 4 and 5. Essentially the recording system of FIG. 8 consists of N channels identified as channel A through channel N. Each channel having the capability of recording its unique analog signal at a plurality of n unique times, each unique time sample recorded in a correspondingly unique detector. The strobe signals, which are the signals that provide the transfer drive fields to the particular associated detectors, are provided by two interlaced shift registers that are triggered by a two-phase clock. An arrangement of the interlaced shift registers and the two-phase clock is such as to provide alternate strobe pulses to succeedingly higher detector columns. In the particular embodiment to be described each of the shift registers provide interlaced 100 ns. This arrangement provides a 50 ns. strobe pulse alternate pulses of 50 ns. (nanosecond) duration every to each detector column and continues at 50 ns. intervals providing a sampling rate per analog signal of 1 sample every 50 ns.

For purposes of the present discussion of the operation of the embodiment of FIG. 8 assume that each channel has a unique analog signal coupled thereto by its respectively associated analog current signal sources 80a through 80n. The timing of the sampling operation is initiated by burst generator 82 coupling an appropriate trigger pulse to two-phase clock 84 which in turn couples alternate clock pulses to shift register 86 and shift register 88 upon receipt of each trigger pulse. The shift registers couple interlaced strobe pulses to detector columns 1 through n in ascending equally spaced intervals. Where desired a controller 90 may be utilized to couple properly timed initiate pulses to analog current signal sources 80a through 80n and burst generator 82. Additionally, if delays between any specific analog signals and/or trigger pulse are required delays 92a through 92n may be inserted intermediate the respective analog current signal source and the channel detectors.

For purposes of discussing the sampling operation assume that at time $t_c$ controller 90 couples suitable control pulses to analog current signal sources 80a through 80n permitting such sources to couple their respective analog signals 94, 96 . . . 98 to their respective longitudinal drive field lines 100a through 100n. As discussed hereinabove such analog signals do not affect the flux level of the associated detectors. Assume then that some subsequent time $t_t$ burst generator 82 couples a trigger pulse to two-phase clock 84 enabling shift register 86 at time $t_0$. Accordingly, at time $t_0$ shift register 86 couples pulse 102a to detector column line 104 that provides a transverse drive field to the associated detectors A–1, B–1 through N–1 setting the magnetization thereof into a biased alignment with their hard axes. Now, at time $t_1$ strobe pulse 102a is abruptly terminated permitting the magnetization of the associated detectors to collapse about their hard axes in a random but biased manner as determined by the intensities of their respectively associated analog signals establishing a partially switched flux level respectively associated with the associated analog signal. Additionally, at time $t_1$ burst generator 82 couples a trigger pulse to two-phase clock 34 enabling shift register 88 to couple strobe pulse 103a to column line 106 which couples a transverse drive field to the associated column detectors setting the magnetization thereof into a biased alignment with their hard axes. Next, at time $t_2$ strobe pulse 103a is abruptly terminated permitting the respectively biased magnetization of detectors A–2, B–2 . . . N–2 to collapse about their hard axes in a random manner as biased by their respectively associated analog signals causing the magnetization thereof to assume a partially switched flux level representative of the amplitude of the associated analog signal at the sampling time $t_2$. In like manner, the sampling procedure continues through the array of detectors A–$n$, B–$n$ . . . N–$n$.

Figure 10:
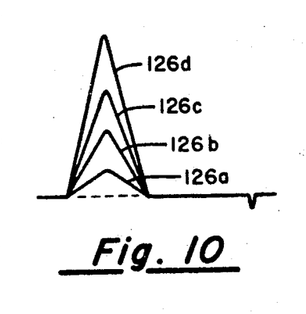
FIG. 10 is an illustration of a set of typical output signal waveforms from the detectors of the recording system of FIG. 8.
Figure 11:
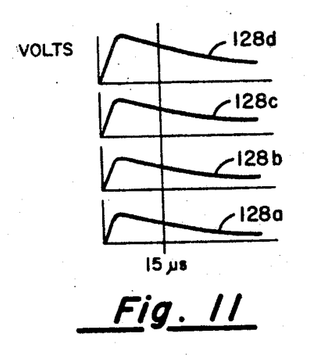
FIG. 11 is a diagram of a set of typical displays upon the face of an oscilloscope of FIG. 8 for the corresponding waveforms of FIG. 10.

Readout of the information stored in the detector array of FIG. 8 is, as respect each individual detector, similar to that described hereinabove. For the readout procedure it is assumed that the analog current signal sources 80a through 80n are deactivated, i.e., coupling no analog signal to their respectively associated channel drive lines 100a through 100n and that two-phase clock 84, as before, emits only one clock signal upon initiation by a trigger pulse from burst generator 82. As discussed hereinabove the readout operation is initiated by the coupling of an appropriate strobe pulse such as 102a to its respectively associated column drive line 104 which in turn generates a transverse drive field in the area of the respectively associated detectors A–1 through N–1 rotating the magnetization thereof into alignment with their hard axes and inducing thereby an appropriate output signal in their respectively associated channel sense lines 120a through 120n. These output signals are then in turn coupled to their respectively associated integrators 122a through 122n which integrate the output signals coupled thereto coupling signals representative of the integral thereof to the respectively associated oscilloscopes 124a through 124n. In this embodiment it is the purpose of integrators 122a through 122n to integrate the output signals induced in the respectively associated channel sense lines 120a through 120n and to provide thereby a signal whose waveform can provide a reliable means of calibrating such detector output signals so as to provide a satisfactory correlation of the level of the data stored in the respective detector with a measured output signal amplitude. In one method of achieving such correlation, detector output signals 126a through 126d (see FIG. 10) when integrated by integrators 122 produce the integrator output signals 128a through 128d, respectively, of FIG. 11. Upon the observation and calibration of signals 128a through 128d as displayed upon oscilloscope 124 it was determined that the amplitudes of such signals after a certain delay time, for example at a time 15μs. (microseconds) after their wavefronts, were in direct correlation with the levels of the data stored in the respective detectors. Accordingly, there has been disclosed herein a method whereby the amplitudes of one or more analog signals may be sampled at any predetermined time and stored in a magnetizable element as a respectively associated partially switched flux level in a manner utilizing the dispersion characteristic of a thin ferromagnetic film as a detector element.

It is understood that suitable modifications may be made in the structure as disclosed provided such modifications come within the spirit and scope of the appended claims. Having now, therefore, fully illustrated and described our invention, what we claim to be new and desire to protect by Letters Patent is set forth in the appended claims.

What is claimed is:

1. A method of operating a thin ferrogmagnetic film memory element having the property of uniaxial anisotropy providing an easy axis along which the memory element's remanent magnetization shall lie and having a dispersion characteristic providing a reproducible level of partial switching of the memory element's magnetization for the storing of discrete amplitudes of a sampled analog signal as a function of the degree of the partial switching of the memory element's magnetization when subjected to drive fields oriented at first and second different angles with its easy axis, comprising:

coupling to a thin ferromagnetic film memory element that has a dispersion characteristic that provides a reproducible level of partial switching of the memory element's magnetization a first drive field at a first angle with the memory element's easy axis for causing the memory element's magnetization to become substantially aligned traverse its easy axis;

coupling to the memory element at a second angle with its easy axis a second drive field;

varying the intensity of said second drive field as a function of the amplitude of a to-be-sampled analog signal;

continuously biasing the otherwise substantially transversely aligned magnetization therefrom as a function of the amplitude of the analog signal;

decoupling the first drive field from the memory element at a sample time permitting the memory element's magnetization to collapse about its easy axis in the analog signal amplitude biased manner for causing a discrete level of partial switching of the memory element's magnetization to be set into the memory element that corresponds to the analog signal amplitude at the sample time.

2. A method of operating a thin ferromagnetic film memory element having the property of uniaxial anisotropy providing an easy axis along which the memory element's remanent magnetiziation shill lie and having a dispersion characteristic providing a reproducible level of partial switching of the memory element's mangnetization for the storing of discrete amplitudes of a sampled analog signal as a function of the degree of the partial switching of the memory element's magnetization when subjected to drive fields oriented longitudinal and transverse its easy axis, comprising:

coupling to a thin ferromagnetic film memory element that has a dispersion characteristic that provides a reproducible level of partial switching of the memory element's magnetization a transverse drive field for causing the memory element's magnetization to become substantially aligned traverse its easy axis;

coupling to the memory element a longitudinal drive field;

varying the intensity and polarity of said longitudinal drive field as a function of the amplitude and polarity of a to-be-sampled analog signal;

continuously biasing the otherwise substantially transversely aligned magnetization therefrom as a function of the amplitude and polarity of the analog signal;

decoupling the transverse drive field from the memory element at a sample time permitting the memory element's magnetization to collapse about its easy axis in the analog signal amplitude and polarity biased manner for causing a discrete level of partial switching of the memory element's magnetization to be set into the memory element that correponds to the analog signal amplitude and polarity at the sample time.

3. A method of operating a plurality of thin ferromagnetic film memory elements that are arranged in a multichannel analog recording system for the sampling of a plurality of analog signals at a plurality of sample times, each memory element having the property of uniaxial anisotropy providing an easy axis along which the memory element's remanent magnetization shall lie and having a dispersion characteristic providing a reproducible level of partial switching of the memory element's magnetization for the storing of discrete amplitudes of a sampled analog signal as a function of the degree of the partial switching of the memory element's magnetization when subjected to drive fields oriented at first and second different angles with its easy axis, comprising:

arranging a plurality of thin ferromagntic film memory elements in to a plurality of memory element associated channels, each of the memory elements having a dispersion characteristic that provides a reproducible level of partial switching of the memory element's magnetization;

coupling first drive fields to the plurality of memory elements for providing in the areas of the memory elements first drive fields that are directed substantially transverse the easy axes of the memory elements and that are of a sufficient intensity to cause each memory element's magnetization to be substantially aligned transverse its easy axis;

coupling to each memory element associated channel a different, associated analog signal for providing in the area of each of the memory elements associated second drive fields;

varying the intensity of each of said second drive fields as the function of the amplitude of the associated analog signal;

continuously biasing the otherwise substantially transversely aligned magnetization therefrom as a function of the amplitude of the associated analog signal;

abruptly decoupling the first drive fields from the memory elements at associated sample times permitting the magnetization of each of the memory elements to collapse about its easy axis in the analog signal amplitude biased manner for establishing the magnetization of each of the memory elements in a discrete level of partial switching that is representative of the amplitude of the associated analog signal at the associated sample time.

4. A method of operating a plurality of thin ferromagnetic film memory elements that are arranged in a multichannel analog recording system for the sampling of a plurality of analog signals at a plurality of sample times, each memory element having the property of uniaxial anisotropy providing an easy axis along which the memory element's remanent magnetization shall lie and having a dispersion characteristic providing a reproducible level of partial switching of the memory element's magnetization for the storing a discrete amplitudes of a sampled analog signal as a function of the degree of the partial switching of the memory element's magnetization when subjected to drive fields oriented longitudinal and transverse its easy axis, comprising:

arranging a plurality of thin ferromagnetic film memory elements into a plurality of memory element associated channels, each of the memory elements having a dispersion characteristic that provides a reproducible level of partial switching of the memory element's magnetization;

coupling first drive fields to the plurality of memory elements for providing in the areas of the memory elements transverse drive fields that are of a sufficient intensity to cause each memory element's magnetization to be substantially aligned transverse its easy axis;

coupling to each memory element associated channel a different, associated analog signal for providing in the area of each of the memory elements associated longitudinal drive fields;

varying the intensity and polarity of each of said longitudinal drive fields as the function of the amplitude and polarity of the associated analog signal;

continuously biasing the otherwise substantially transversely aligned magnetization therefrom as a function of the amplitude and polarity of the associated analog signal;

abruptly decoupling the transverse drive fields from the memory elements at associated sample times permitting the magnetization of each of the memory elements to collapse about its easy axis in the analog signal amplitude and polarity biased manner for establishing the magnetization of each of the memory elements in a discrete level of partial switching that is representative of the amplitude and polarity of the associated analog signal at the associated sample time.

5. A method of operating a plurality of thin ferromagnetic film memory elements that are arranged in an analog recording channel for the sampling of an analog signal at a plurality of different sample times, each memory element having the property of uniaxial anisotropy providing an easy axis along which the memory element's remanent magnetization shall lie and having a dispersion characteristic providing a reproducible level of partial switching of the memory element's magnetization for the storing of discrete amplitudes of a sampled analog signal as a function of the degree of the partial switching of the memory element's magnetization when subjected to drive fields oriented at first and second different angles with its easy axis, comprising:

arranging a plurality of thin ferromagnetic film memory elements into a memory element associated channel, each of the memory elements having a dispersion characteristic that provides a reproducible level of partial switching of the memory element's magnetization;

coupling first drive fields to the memory elements for providing in the areas of the memory elements first drive fields that are directed substantially transverse the easy axes of the memory elements and that are of a sufficient intensity to cause each memory element's magnetization to be substantially aligned transverse its easy axis;

coupling to the memory element associated channel an analog signal for providing in the area of each of the memory elements associated second drive fields;

varying the intensity of each of said second drive fields as the function of the amplitude of the analog signal;

continuously biasing the otherwise substantially transversely aligned magnetization therefrom as a function of the amplitude of the analog signal;

abruptly decoupling the first drive fields from the memory elements at associated different sample times permitting the magnetization of each of the memory elements to collapse about its easy axis in the analog signal amplitude biased manner for establishing the magnetization of each of the memory elements in a discrete level of partial switching that is representative of the amplitude of the analog signal at the associated different sample time.

6. A method of operating a plurality of thin ferromagnetic film memory elements that are arranged in an analog recording channel for the sampling of an analog signal at a plurality of different sample times, each memory element having the property of uniaxial anisotropy providing an easy axis along which the memory element's remanent magnetization shall lie and having a dispersion characteristic providing a reproducible level of partial switching of the memory element's magnetization for the storing of discrete amplitudes of a sampled analog signal as a function of the degree of the partial switching of the memory element's magnetization when subjected to drive fields oriented longitudinal and transverse its easy axis, comprising:

arranging a plurality of thin ferromagnetic film memory elements into a memory element associated channel, each of the memory elements having a dispersion characteristic that provides a reproducible level of partial switching of the memory element's magnetization;

coupling first drive fields to the memory elements for providing in the areas of the memory elements transverse drive fields that are of a sufficient intensity to cause each memory element's magnetization to be substantially aligned transverse its easy axis;

coupling to the memory element associated channel an analog signal for providing in the area of each of the memory elements associated longitudinal drive fields;

varying the intensity of each of said longitudinal drive fields as a function of the amplitude and polarity of the analog signal;

continuously biasing the otherwise substantially transversely aligned magnetization therefrom as a function of the amplitude and polarity of the analog signal;

abruptly decoupling the transverse drive fields from the memory elements at associated different sample times permitting the magnetization of each of the memory elements to collapse about its easy axis in the analog signal amplitude and polarity biased manner for establishing the magnetization of each of the memory elements in a discrete level of partial switching that is representative of the amplitude and polarity of the analog signal at the associated different sample time.

References Cited

UNITED STATES PATENTS

| | | | |
|---|---|---|---|
| 3,191,168 | 6/1965 | Barrett | 340—174 XR |
| 3,188,613 | 6/1965 | Fedde | 340—174 |
| 3,320,597 | 5/1967 | Hart | 340—174 |
| 3,328,786 | 6/1967 | Hewitt et al. | 340—174 |

FOREIGN PATENTS 968,964  9/1964  Great Britain.

BERNARD KONICK, Primary Examiner

GARY M. HOFFMAN, Assistant Examiner